US006199011B1

(12) United States Patent
Matsuda

(10) Patent No.: US 6,199,011 B1
(45) Date of Patent: Mar. 6, 2001

(54) NAVIGATION SYSTEM AND A VEHICLE CONTROL SYSTEM

(75) Inventor: Shohei Matsuda, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 09/110,865

(22) Filed: Jul. 7, 1998

(30) Foreign Application Priority Data

Jul. 9, 1997 (JP) ................................................. 9-183613

(51) Int. Cl.$^7$ ................................................. G06F 165/00
(52) U.S. Cl. .................... 701/208; 701/207; 701/209; 701/210; 701/212; 701/214; 340/988; 340/990
(58) Field of Search ................... 701/70, 78, 79, 701/200, 207, 208, 209, 210, 212, 213, 214, 216, 221, 300; 340/988, 990, 995, 438

(56) References Cited

U.S. PATENT DOCUMENTS

| | | | |
|---|---|---|---|
| 5,383,127 | * | 1/1995 | Shibata .................................. 701/216 |
| 5,469,360 | * | 11/1995 | Ihara et al. ............................ 701/217 |
| 5,512,904 | * | 4/1996 | Bennett ................................. 701/217 |
| 5,884,218 | * | 3/1999 | Nimura et al. ........................ 701/208 |

* cited by examiner

Primary Examiner—William A. Cuchlinksi, Jr.
Assistant Examiner—Gertrude Arthur
(74) Attorney, Agent, or Firm—Arent Fox Kintner Plotkin & Kahn, PLLC

(57) ABSTRACT

A navigation system is provided where an error in the road data and an omission of the road data can be compensated for, and a vehicle control system is provided for using the navigation system. A yaw rate generation starting position, a yaw rate peak position and a yaw rate generation finishing position of a traveling vehicle are detected. The three positions determined are an inlet position, a central position and an outlet position of a curved road. If the three positions are offset to positions of nodes $N_2$, $N_3$ and $N_4$ on the curved road stored in a map information storing means of the navigation system, the positions of the nodes $N_2$, $N_3$ and $N_4$ are corrected so that they are matched with the three positions. It is determined based on the corrected road data whether it is possible for a subject vehicle to pass through a road ahead of the subject vehicle. When it is impossible for the subject vehicle to pass through the road, a warning to a driver or an automatic speed reduction is carried out.

13 Claims, 4 Drawing Sheets

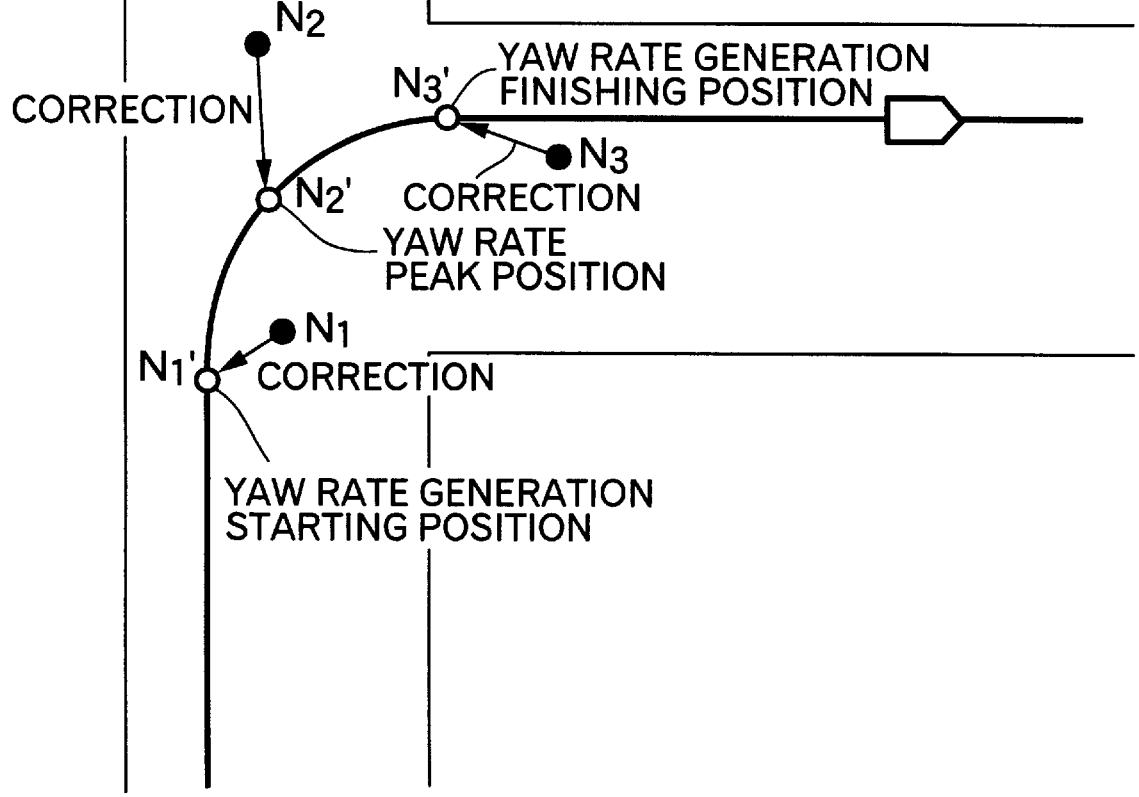

NAVIGATION SYSTEM AND A VEHICLE CONTROL SYSTEM

DETAILED DESCRIPTION OF THE INVENTION

1. Field of the Invention

The present invention relates to a navigation system including a map information storing means having road data stored therein, and a subject-vehicle position detecting means for detecting the position of a subject vehicle on a map, and to a vehicle control system using the navigation system.

2. Background of the Invention

Road data used in a navigation system is formed of a large number of nodes established at predetermined distances on a road. The road data is previously stored in a storage medium such as a CD-ROM or the like. When a radius of curvature of a curved road is calculated based on such road data, it is common to use a technique for determining a radius of an arc of a circle passing through three continuous nodes. Therefore, if there is no error in the coordinates of the three nodes $N_1$, $N_2$ and $N_3$, which are established at an inlet position, a central position and an outlet position of a curved road, as shown in FIG. 4, the radius of curvature of the curved road which is calculated from the coordinates of the three nodes $N_1$, $N_2$ and $N_3$ is R.

However, if the node $N_2$ which is established, for example, at the central position of the curved road, is offset to a radially outer position (a position $N_2'$), the radius of curvature of the curved road calculated from the coordinates of the three nodes $N_1$, $N_2'$ and $N_3$ is R' and smaller than the correct radius R of curvature, resulting in the generation of an error.

When the position of the road has been changed due to repair work, or when a road has been newly constructed, it is impossible to cope with these situations in a conventional navigation system, because there is no road data for such a road in a storage medium.

SUMMARY OF THE INVENTION

The present invention has been accomplished with the above circumstance in mind. It is therefore an object of the present invention to provide a navigation system which can compensate for any errors in the road data and/or omission of the road data, and to provide a vehicle control system using the navigation system.

To achieve the above object, according to a first aspect and feature of the present invention, there is provided a navigation system comprising a map information storing means having road data stored therein. A subject-vehicle position detecting means detects the position of a subject vehicle on a map. The navigation system further includes an azimuth angle-varied state detecting means which detects the azimuth angle-varied state of the subject vehicle. A road data correcting means corrects the road data stored in the map information storing means based on the azimuth angle-varied state and the position of the subject vehicle.

With the above arrangement, the error of the road data corresponding to an inlet position, a central position and an outlet position of a curved road or a branch road can be accurately corrected based on the azimuth angle-varied state of the subject vehicle and the position of the subject vehicle at that time. The correcting of the road data includes newly establishing omitted road data.

According to a second aspect and feature of the present invention, in addition to the first feature, the azimuth angle-varied state detecting means detects at least one of an inlet position, a central position and an outlet position of a curved road based on the detected azimuth angle-varied state.

With the above arrangement, it is possible to detect the inlet position, the central position and the outlet position of the curved road which are important for determining the shape of the curved road.

According to another aspect and feature of the present invention, in addition to the second aspect, the azimuth angle-varied state detecting means detects a yaw rate generation starting position of the subject vehicle as the inlet position of the curved road.

With the above arrangement, the inlet position of the curved road can be accurately detected.

According to another aspect and feature of the present invention, in addition to the second aspect, the azimuth angle-varied state detecting means detects a yaw rate generation finishing position of the subject vehicle as the outlet position of the curved road.

With the arrangement, the outlet position of the curved road can be accurately detected.

According to a further aspect and feature of the present invention, in addition to the second aspect, the azimuth angle-varied state detecting means detects a yaw rate peak position of the subject vehicle as the central position of the curved road.

With the arrangement, the central position of the curved road can be accurately detected.

According to another aspect and feature of the present invention, in addition to the first aspect, the azimuth angle-varied state detecting means detects at least one of an inlet position, a central position and an outlet position of a branch road based on the detected azimuth angle-varied state.

With the above arrangement, it is possible to detect the inlet position, the central position and the outlet position of the curved road which are important for determining the shape of the branch road.

According to another aspect and feature of the present invention, in addition to the above aspect, the azimuth angle-varied state detecting means detects a yaw rate generation starting position of the subject vehicle as the inlet position of the branch road.

With the above arrangement, the inlet position of the branch road can be accurately detected.

According to a further aspect and feature of the present invention, in addition to the above aspect, the azimuth angle-varied state detecting means detects a yaw rate generation finishing position of the subject vehicle as the outlet position of the branch road.

With the above arrangement, the outlet position of the branch road can be accurately detected.

According to another aspect and feature of the present invention, in addition to the above aspect, the azimuth angle-varied state detecting means detects a yaw rate peak position of the subject vehicle as the central position of the branch road.

With the above arrangement, the central position of the branch road can be accurately detected.

According to a further aspect and feature of the present invention, there is provided a vehicle control system including a navigation system according to any of the above aspects, comprising an ahead-road shape determining means for determining the shape of a road ahead of the subject vehicle based on the road data resulting from the correction by the road data correcting means, an appropriate passage speed calculating means for calculating an appropriate passage speed on the road ahead of the subject vehicle determined by the ahead-road shape determining means, and a vehicle control means for carrying out the vehicle control based on a vehicle speed of the subject vehicle and the appropriate passage speed calculated by the appropriate passage speed calculating means.

With the above arrangement, the shape of the road ahead of the subject vehicle is determined based on the corrected road data, and the vehicle control is carried out based on a determined appropriate passage speed of the road ahead of the subject vehicle and a vehicle speed of the subject vehicle. Therefore, it is possible to properly carry out the vehicle control for permitting the subject vehicle to safely pass through the road ahead of the subject vehicle. The vehicle control includes a warning to a driver, in addition to an automatic decelerating control and a steering operation assisting control for permitting the vehicle to pass through the curved road.

BRIEF DESCRIPTION OF THE DRAWINGS

FIG. 3 is an illustration for explaining the operation of correcting road data for a branch road.

DESCRIPTION OF THE PREFERRED EMBODIMENTS

The mode for carrying out the present invention will now be described by way of an embodiment shown in the accompanying drawings.

Figure 1:
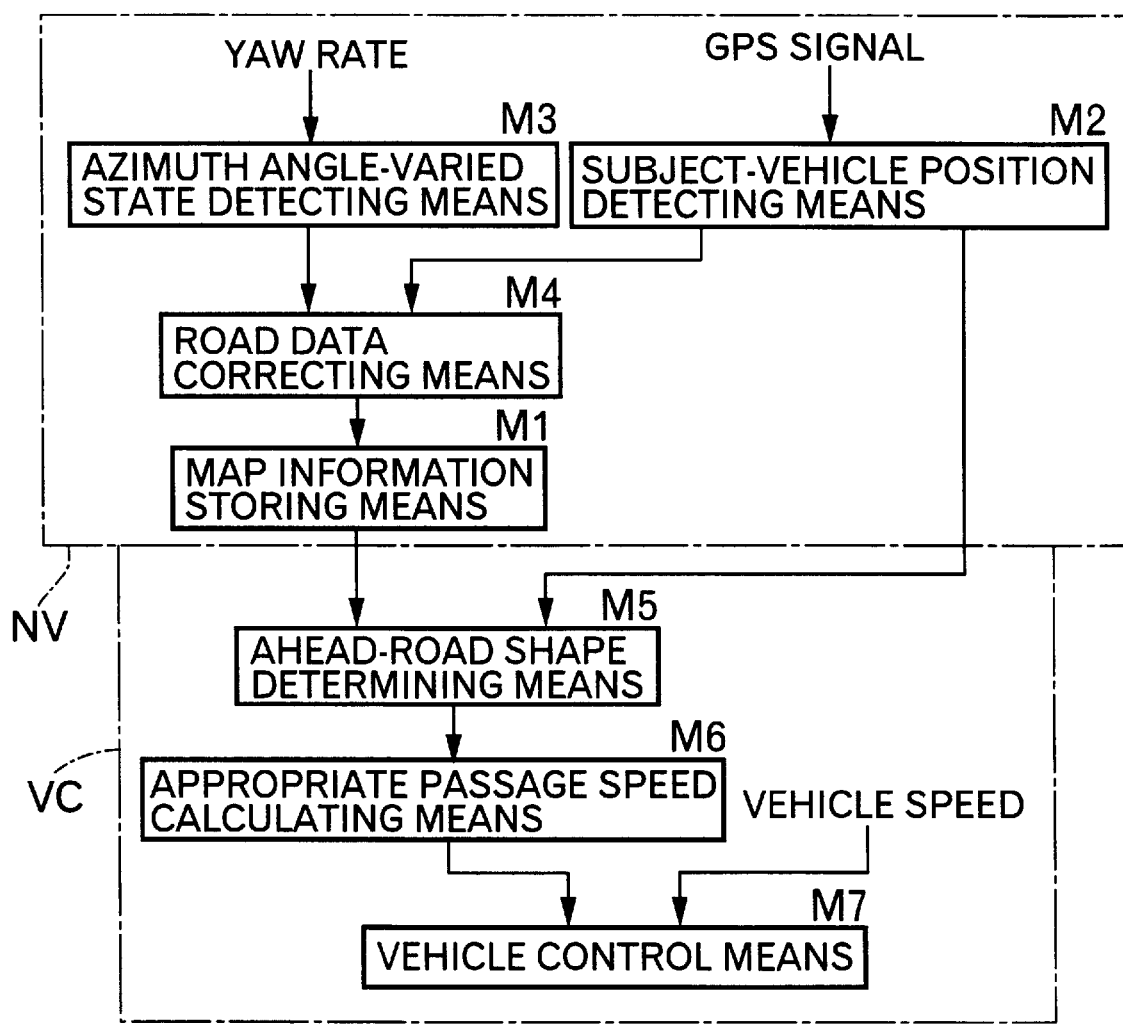
FIG. 1 is a block diagram showing the entire arrangement of a navigation system and a vehicle control system.
Figure 2A:
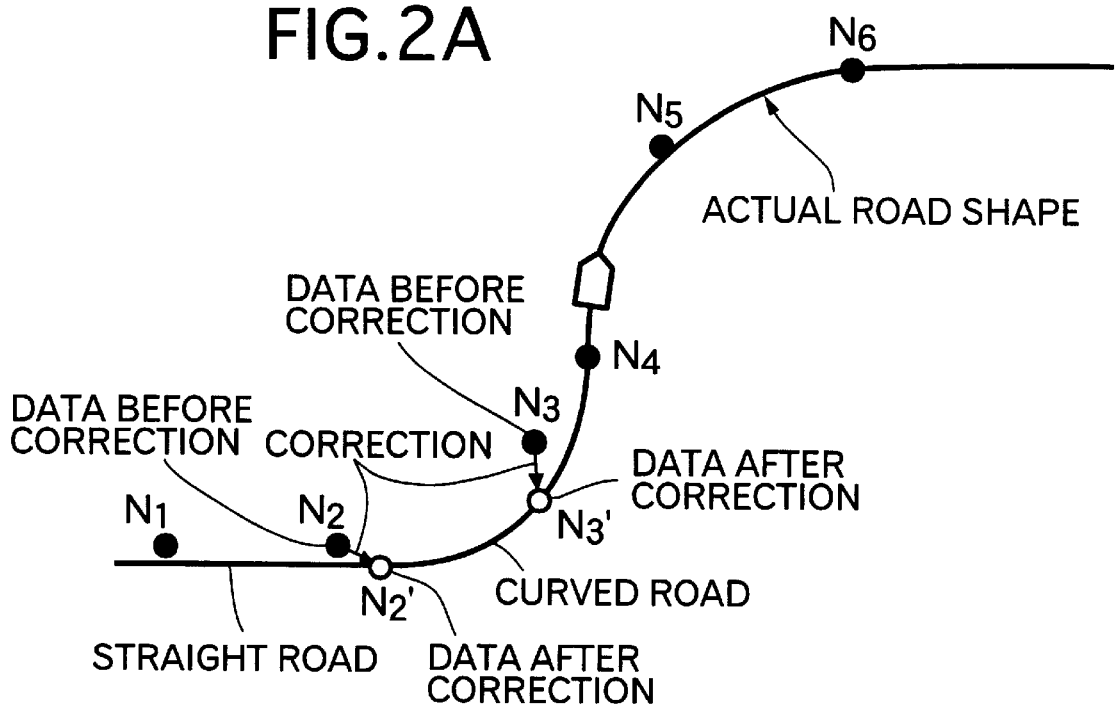
FIGS. 2A–2B are illustrations for explaining the operation of correcting road data for a curved road.
Figure 2B:
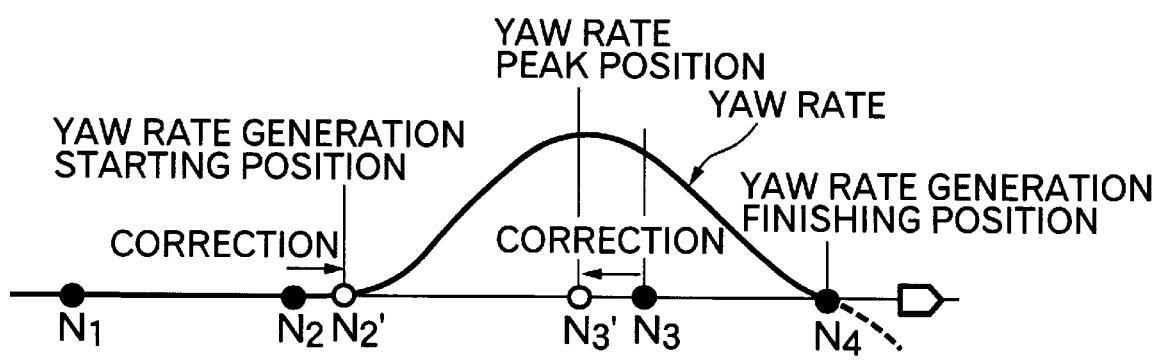

FIGS. 1 to 3 show an embodiment of the present invention. FIG. 1 is a block diagram showing the entire arrangement of a navigation system and a vehicle control system; FIGS. 2A–2B are illustrations for explaining the operation of correcting road data for a curved road; and FIG. 3 is an illustration for explaining the operation of correcting road data for a branch road.

As shown in FIG. 1, a navigation system NV according to this embodiment includes a map information storing means M1, a subject-vehicle position detecting means M2, an azimuth angle-varied state detecting means M3, and a road data correcting means M4.

The map information storing means M1 is formed from a storing medium such as a magneto optical disk (MO) which is capable of rewriting stored contents, and is previously stored with road data comprising coordinates of a large number of nodes N established at predetermined distances on a road. The subject-vehicle position detecting means M2 detects the position P of the subject vehicle on a map by superposing subject-vehicle position data which is received from a GPS antenna, onto the road data.

The azimuth angle-varied state detecting means M3 detects that the subject vehicle exists at one of an inlet position, a central position and an outlet position of a curved road or a branch road, based on a yaw rate detected by a yaw rate sensor. When it is detected by the azimuth angle-varied state detecting means M3 that the subject vehicle exists at the inlet position, the central position or the outlet position of the curved road or the branch road, the road data correcting means M4 corrects the road data stored in the map information storing means M1, or newly establishes road data which are not stored in the map information storing means M1, based on the position of the subject vehicle at that time.

A vehicle control system VC according to this embodiment includes an ahead-road shape determining means M5, an appropriate passage speed calculating means M6 and a vehicle control means M7.

Figure 4:
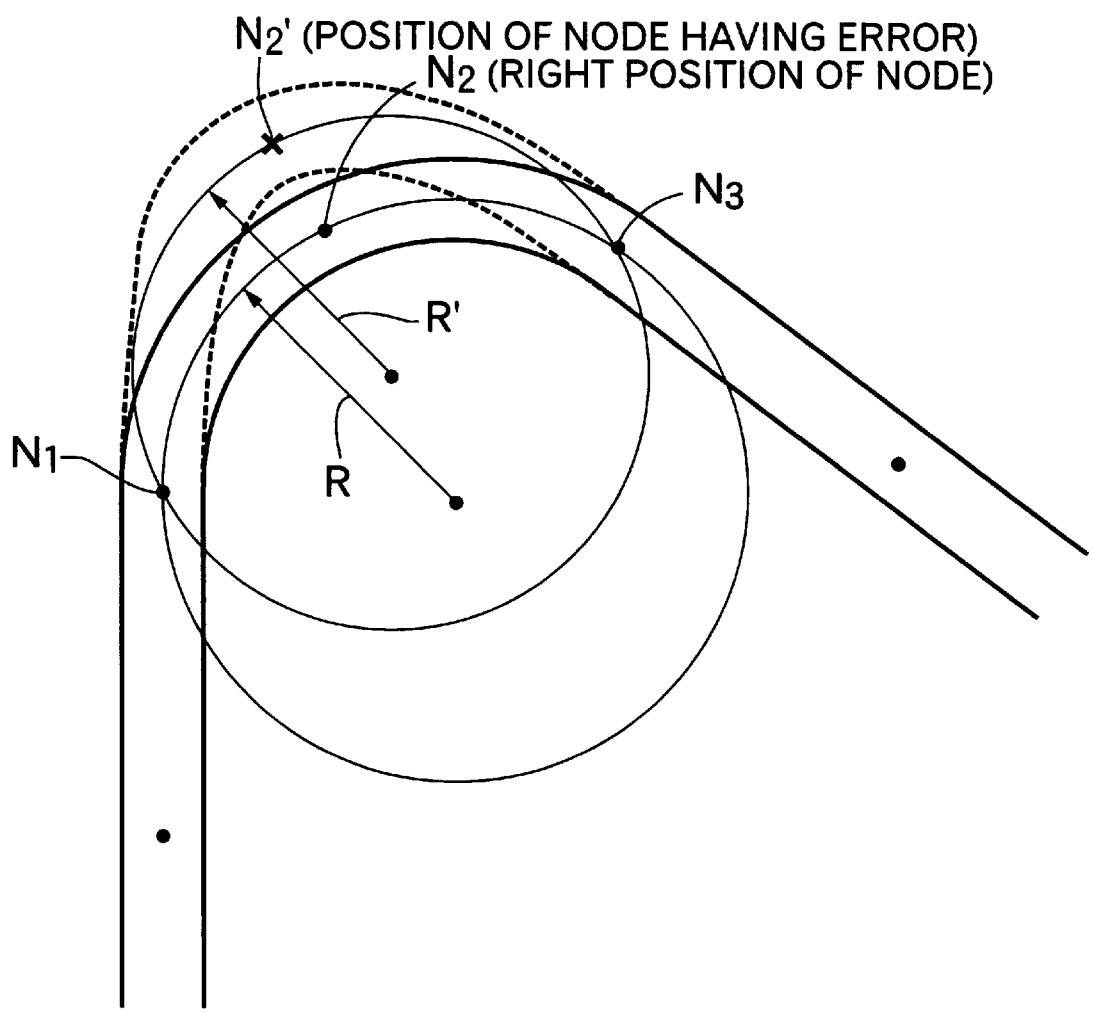
FIG. 4 is an illustration for explaining the problem arisen due to an error in the road data.

The ahead-road shape determining means M5 determines the shape of a road including a radius R of curvature of a curved road ahead of the position of the subject vehicle based on the position of the subject vehicle detected by the subject-vehicle position detecting means M2 and the road data read from the map information storing means M1. The radius R of curvature of the curved road can be calculated based on coordinates of three nodes N continuously existing on the curved road (see FIG. 4). The appropriate passage speed calculating means M6 calculates an appropriate passage speed enabling the vehicle to safely pass through the nodes N on the curved road, based on the determined road shape. The appropriate passage speed is a vehicle speed at which a lateral acceleration generated during passing of the vehicle through the nodes N on the curved road does not exceed a predetermined value. On a steep curve which is difficult for the vehicle to pass through, the appropriate passage speed is a low speed, and on a gentle curve which is easy for the vehicle to pass through, the appropriate passage speed is a higher speed than the speed through the steep curve.

The vehicle control means M7 predicts a predicted passage speed for passage of the vehicle through the nodes N on the curved road based on a vehicle speed detected by a vehicle speed sensor. When the predicted passage speed exceeds the appropriate passage speed, a vehicle control which will be described below is carried out. The vehicle control means M7 operates a warning device such as a buzzer, a chime, a speaker, a lamp and the like to urge a driver to decelerate the vehicle, in order to reduce the predicted passage speed to be equal to or lower than the appropriate passage speed. When the deceleration of the vehicle is not sufficiently carried out even after the warning, a brake device is operated or a throttle valve is closed to automatically decelerate the vehicle. Additionally, an actuator for a steering device is operated to assist in a steering operation by the driver for allowing the vehicle to pass through the curved road.

The correction of the road data by the road data correcting means M4 will be described below.

The azimuth angle during traveling of the vehicle on a straight road is constant. Hence, a yaw rate which is a rate of variation in azimuth angle with time is zero. When the vehicle passes through the curved road, the azimuth angle is varied momentarily (i.e., the azimuth angle is transient). Hence, a yaw rate is generated with a variation. In the shape of a general curved road, the yaw rate of the vehicle is increased from zero to a peak value from the inlet position to the central position of the curved road, and is decreased from the peak value to zero from the central position to the outlet position of the curved road. Therefore, if the hysteresis of the yaw rate of the vehicle is observed, the inlet position, the central position and the outlet position of the curved road can be known.

This will be further described. As shown in FIG. 2A, each of nodes $N_1, N_2, N_3$—which are road data stored in the map information storing means M1 has a slight position error with respect to an actual road shape. As shown in FIG. 2B, when the vehicle travels on a straight road via the node $N_1$ to near the node $N_2$, a detected yaw rate is zero. However, when the vehicle enters the inlet position of the curved road from the straight road, a yaw rate is generated. This yaw rate reaches a peak value at the central position of the curved road, and is then gradually decreased as the vehicle travels toward the outlet position. As described above, it is presumed that when the yaw rate rises from zero, the vehicle is at the inlet position of the curved road; when the yaw rate reaches the peak value, the vehicle is at the central position of the curved road; and when the yaw rate is returned to zero, the vehicle is at the output position of the curved road. Therefore, accurate road data can be provided by correcting the stored road data, so that the positions of the nodes N stored in the map information storing means M1 overlap the above-described three positions.

More specifically, the position of the node $N_2$ is offset rearward from an inlet position $N_2'$ of the curved road. Hence, the node $N_2$ established theoretically for the actual road can be corrected to a correct position by replacing the coordinates of the node $N_2$ stored in the map information storing means M1 by coordinates of the inlet position $N_2'$ on the curved road. The position of the node $N_3$ is offset forwards from a central position $N_3'$ on the curved road.

Hence, the node $N_3$ established theoretically for the actual road can be corrected to a correct position by replacing the coordinates of the node $N_3$ stored in the map information storing means M1 by coordinates of the central position $N_3'$ on the curved road. When the node is established from the beginning at a correct position on the road, as is the node $N_4$, it is unnecessary to correct the data for the node $N_4$.

In this manner, the road data of the road on which the vehicle has traveled once is automatically corrected. Hence, the determination of the road shape by the ahead-road shape determining means M5 can be further accurately carried out to enable the proper vehicle control, when the vehicle again travels on such a road. Moreover, the corrected road data are road data for the inlet position, the central position and the outlet position of the curved road. This is extremely effective for knowing the correct shape of the curved road.

The correction of the road data during the passage of the vehicle through the curved road has been described above, but road data for an inlet position, a central position and an outlet position of a branch road can be automatically corrected by detecting a yaw rate generation starting position $N_1'$, a yaw rate peak position $N_2'$ and a yaw rate generation finishing position $N_3'$ when the vehicle passes through the branch road, and renewing the coordinates of the node $N_1$, $N_2$ and $N_3$ actually stored with the coordinates $N_1'$, $N_2'$ and $N_3'$, as shown in FIG. 3. The branch road is not limited to a T-shaped road shown in FIG. 3, and may be a cross-shaped road, a Y-shaped road, a five-forked road or the like.

It should be noted that the above-described road data need not be stored from the beginning in the map information storing means M1, or when some of the road data is omitted, the road data can be newly established by the road data correcting means M4. The subject-vehicle position detecting means M2 using the GPS signal has been illustrated in the embodiment, but a subject vehicle position detecting means for detecting the position of the subject vehicle in an inertial navigation process by a gyroscopic device, or a subject-vehicle position detecting means for detecting the position of the subject vehicle using both of the GPS signal and the inertial navigation process, may be used. In addition, in place of the detection of the yaw rate by the yaw rate sensor, a yaw rate may be calculated based on a lateral acceleration detected by a lateral acceleration sensor and the vehicle speed detected by the vehicle speed sensor.

As discussed above, according to a first aspect of the present invention, the error of the road data corresponding to the inlet position, the central position and the outlet position of the curved road or the branch road can be accurately corrected based on the transient azimuth angle-varied state of the subject vehicle and the position of the vehicle at that time.

According to another aspect of the present invention, it is possible to detect the inlet position, the central position and the outlet position of the curved road which are important for determining the shape of the curved road.

According to a further aspect of the present invention, the inlet position of the curved road can be accurately detected.

According to another aspect of the present invention, the outlet position of the curved road can be accurately detected.

According to a further aspect of the present invention, the central position of the curved road can be accurately detected.

According to yet another aspect of the present invention, it is possible to detect the inlet position, the central position and the outlet position of the branch road which are important for determining the shape of the branch road.

According to a still further aspect of the present invention, the inlet position of the branch road can be accurately detected.

According to another aspect of the present invention, the outlet position of the branch road can be accurately detected.

According to a further aspect of the present invention, the central position of the branch road can be accurately detected.

According to still another aspect of the present invention, the shape of the road ahead of the subject vehicle is determined based on the corrected road data, and the vehicle control is carried out based on the determined appropriate passage speed of the road ahead of the subject vehicle and the vehicle speed of the subject vehicle. Therefore, it is possible to properly carry out the vehicle control for permitting the subject vehicle to safely pass through the road ahead of the subject vehicle.

Although the embodiment of the present invention has been described in detail, various modifications may be made without departing from the spirit and scope of the subject matter of the invention.

What is claimed is:

1. A navigation system comprising:
    a map information storing means having road data stored therein;
    a subject-vehicle position detecting means for detecting the position of a subject vehicle on a map;
    an azimuth angle-varied state detecting means for detecting a transient azimuth angle-varied state of the subject vehicle; and
    a road data correcting means for correcting the road data stored in said map information storing means based on the transient azimuth angle-varied state and the position of the subject vehicle,
    wherein said azimuth angle-varied state detecting means detects at least one of an inlet position, a central position and an outlet position of a curved road based on the detected transient azimuth angle-varied state.

2. A navigation system according to claim 1, wherein said azimuth angle-varied state detecting means detects a yaw rate generation starting position of the subject vehicle as said inlet position of the curved road.

3. A navigation system according to claim 1, wherein said azimuth angle-varied state detecting means detects a yaw rate generation finishing position of the subject vehicle as said outlet position of the curved road.

4. A navigation system according to claim 1, wherein said azimuth angle-varied state detecting means detects a yaw rate peak position of the subject vehicle as said central position of the curved road.

5. A vehicle control system including a navigation system according to any of claims 1 to 4, further comprising
- an ahead-road shape determining means for determining the shape of a road ahead of the subject vehicle based on the road data resulting from the correction by the road data correcting means,
- an appropriate passage speed calculating means for calculating an appropriate passage speed on the road ahead of the subject vehicle determined by said ahead-road shape determining means, and
- a vehicle control means for carrying out the vehicle control based on a vehicle speed of the subject vehicle and the appropriate passage speed calculated by said appropriate passage speed calculating means.

6. A vehicle control system according to claim 5 further comprising a warning means for warning a driver of the subject vehicle to decelerate the subject vehicle.

7. A vehicle control system according to claim 6, wherein said warning means is operated by said vehicle control means.

8. A vehicle control system according to claim 5, further comprising a brake operating device for automatically braking the vehicle.

9. A vehicle control system according to claim 5, further comprising a throttle control device for automatically closing a throttle valve.

10. A navigation system comprising:
- a map information storing means having road data stored therein;
- a subject-vehicle position detecting means for detecting the position of a subject vehicle on a map;
- an azimuth angle-varied state detecting means for detecting a transient azimuth angle-varied state of the subject vehicle; and
- a road data correcting means for correcting the road data stored in said map information storing means based on the transient azimuth angle-varied state and the position of the subject vehicle,
- wherein said azimuth angle-varied state detecting means detects at least one of an inlet position, a central position and an outlet position of a branch road based on the detected transient azimuth angle-varied state.

11. A navigation system according to claim 10, wherein said azimuth angle-varied state detecting means detects a yaw rate generation starting position of the subject vehicle as said inlet position of the branch road.

12. A navigation system according to claim 10, wherein said azimuth angle-varied state detecting means detects a yaw rate generation finishing position of the subject vehicle as said outlet position of the branch road.

13. A navigation system according to claim 10, wherein said azimuth angle-varied state detecting means detects a yaw rate peak position of the subject vehicle as said central position of the branch road.

* * * * *